(12) United States Patent
Yoshida

(10) Patent No.: US 6,357,737 B1
(45) Date of Patent: Mar. 19, 2002

(54) FACSIMILE APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/288,783

(22) Filed: Apr. 9, 1999

(30) Foreign Application Priority Data

Apr. 13, 1998 (JP) .......................................... 10-117830

(51) Int. Cl.[7] .............................................. B65H 33/04
(52) U.S. Cl. ............................... 270/58.08; 270/58.14; 270/58.18
(58) Field of Search ......................... 270/58.14, 58.18, 270/58.09, 58.19, 58.08

(56) References Cited

U.S. PATENT DOCUMENTS

| | | | | |
|---|---|---|---|---|
| 3,191,925 A | * | 6/1965 | McCain et al. | |
| 4,917,366 A | * | 4/1990 | Murakami et al. | 270/58.09 |
| 5,060,921 A | * | 10/1991 | Higashio et al. | 270/58.09 |
| 5,073,803 A | * | 12/1991 | Kato et al. | 399/369 |
| 5,430,468 A | | 7/1995 | Sasai et al. | 346/136 |
| 5,464,201 A | * | 11/1995 | Deen et al. | |
| 5,530,556 A | | 6/1996 | Miura et al. | 358/300 |
| 5,625,860 A | * | 4/1997 | Maeda et al. | 399/403 |
| 5,765,824 A | * | 6/1998 | Kawano et al. | 270/58.11 |
| 5,797,596 A | * | 8/1998 | Morigami et al. | 270/58.11 |
| 5,852,765 A | * | 12/1998 | Yamashita et al. | 399/407 |
| 5,895,036 A | * | 4/1999 | Asao | 270/58.09 |
| 5,960,248 A | * | 9/1999 | Ohno | 399/410 |
| 5,971,384 A | * | 10/1999 | Asao | 270/58.13 |

* cited by examiner

Primary Examiner—Christopher P. Ellis
Assistant Examiner—Richard Ridley
(74) Attorney, Agent, or Firm—Fitzpatrick, Cella, Harper & Scinto

(57) ABSTRACT

There is provided a facsimile apparatus capable of effectively utilizing the stapling function and the sorter function with plural bins according to the number of the received sheets. The maximum number of the received sheets to be stapled is registered in a registration circuit. In case the number of the received sheets in a communication does not exceed a predetermined number, the received sheets of each communication are stapled and discharged to a predetermined bin. If the number of the received sheets in a communication exceeds the predetermined number, the sheets are not stapled and the discharge bin is changed for each communication. The non-stapled received sheets are not discharged to the bin for discharging the stapled sheets. In case only one sheet is received, such sheet is discharged, without stapling, to the predetermined bin.

6 Claims, 10 Drawing Sheets

FACSIMILE APPARATUS

BACKGROUND OF THE INVENTION

1. Field of the Invention

The present invention relates to a facsimile apparatus having a function of stapling received sheets of a communication.

2. Related Background Art

In the facsimile apparatus with stapling function, there has conventionally been proposed a facsimile apparatus capable of stapling the received sheets for each communication, thereby facilitating the sorting of the received sheets.

Also there has been proposed a facsimile apparatus having a sorter provided with plural output bins and adapted to change the output bin for each communication.

However, such conventional facsimile apparatus with the stapling function has been associated with a drawback of becoming incapable of stapling if the number of the received sheets per communication increases.

On the other hand, the facsimile apparatus with the sorter of plural output bins has been associated with a drawback that, if all the received sheets are sorted by the respective communications and if the number of communications received per day is large, the sorting becomes impossible because the number of the output bins is limited. Also if the number of the output bins is increased significantly, the facsimile apparatus becomes inevitably large in size and higher in cost.

SUMMARY OF THE INVENTION

In consideration of the foregoing, the object of the present invention is to provide a facsimile apparatus capable of effectively utilizing the stapling function and the sorter function according to the number of the received sheets.

DESCRIPTION OF THE PREFERRED EMBODIMENTS

Figure 1:
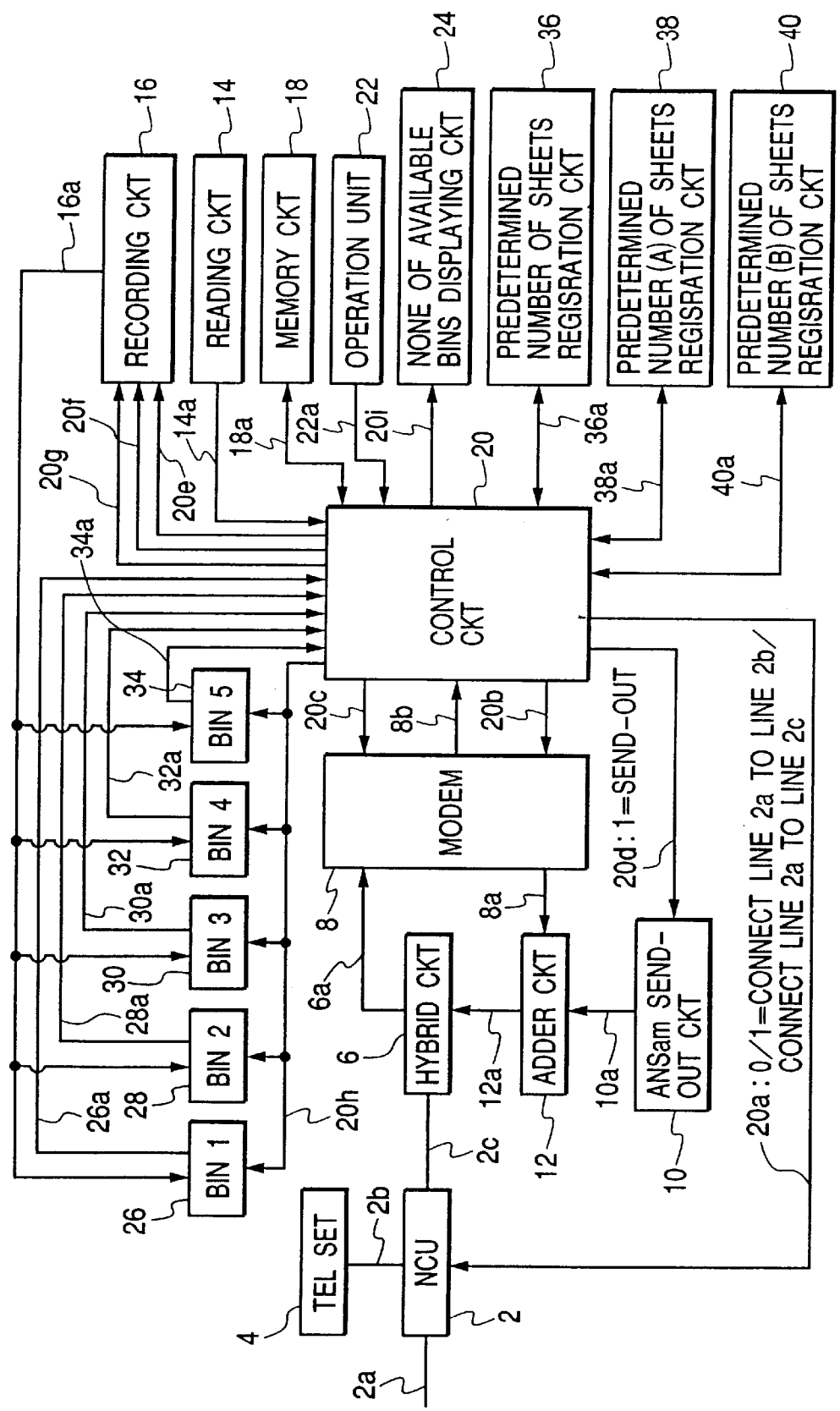
FIG. 1 is a block diagram of an embodiment of the present invention.

FIG. 1 is a block diagram showing the configuration of a facsimile apparatus embodying the present invention.

For utilizing a telephone network for data communication, an NCU (network control unit) 2 is connected to a terminal of the network, executing connection control of the telephone network, switching to the data communication channel, loop holding, etc. The NCU 2 connects a telephone line 2a to a telephone set 4 if a signal level of a signal line 20a from a control circuit 20 is "0", but connects the telephone line 2a to the facsimile apparatus if the signal level is "1". In the ordinary state, the telephone line 2a is connected to the telephone set 4.

A hybrid circuit 6 separates transmission signals and reception signals, and sends a transmission signal from an adder circuit 12 to the telephone line 2a through the NCU 2, and receives a signal from a communication partner through the NCU 2 and sends the signal to a modem 8 through a signal line 6a.

A modem 8 executes modulation and demodulation according to the ITU-T recommendation V. 8, V. 21, V. 27 ter, V. 29, V. 17 and V. 34, and the transmission mode is designated by a signal line 20c. The modem 8 enters the signal supplied to a signal line 20b and outputs modulated data to a signal line 8a, and also enters a received signal supplied to the signal line 6a and outputs demodulated data to a signal line 8b.

An ANSam signal sending circuit 10, for sending an ANSam signal, is adapted to send the ANSam signal to a signal line 10a when a signal of a level "1" is supplied to a signal line 20d, but to send no signal to the signal line 10a when the signal level is "0".

The adder circuit 12 enters the information on the signal lines 8a and 10a, and outputs the result of addition to a signal line 12a. A reading circuit 14 reads the image of an original and outputs the read image data to a signal line 14a.

A recording circuit 16 records the information outputted on a signal line 20e, line by line. It also staples the recorded (received) sheets when a stapler pulse is generated on a signal line 20f, and it ejects the recorded (received) sheets to a bin designated by a signal line 20h when an output pulse is generated on a signal line 20g.

A memory circuit 18 is used for storing raw or encoded information of the read data, and also for storing received or decoded information.

An operation unit 22 is provided with a one-touch dial, a shortened dial, numeral keys, *# keys, registration keys for registration circuits 36, 38, 40, a set key, a start key, a memory reception output key and other functions keys, and the information of a depressed key is outputted to a signal line 22a.

A display circuit 24 is to provide a display indicating that the output bins are full so that the recording sheet can no longer be outputted, and provides such display or not respectively when the signal level on a signal line 20i is "1" or "0".

Bins 26, 28, 30, 32, 34 are respectively output bins 1, 2, 3, 4 and 5 for outputting the recorded sheets. When a bin output pulse is generated on the signal line 20g while a signal "1" is outputted on the signal line 20h, the recorded sheets are outputted to the bin 1. Similarly, when a bin output pulse is generated on the signal line 20g while a signal "2", "3", "4" or "5" is outputted on the signal line 20h, the recorded sheets are outputted to the bin 2, 3, 4 or When the bin 1 contains a recorded sheet or not, a signal of a level "1" or "0" is respectively outputted on a signal line 26a. Similarly, the information on the presence or absence of the recorded sheet in the bin 2, 3, 4 or 5 is outputted on a signal line 28a, 30a, 32a or 34a.

A registration circuit 36 registers, through a signal line 36a, a predetermined maximum number of received sheets to be stapled, for example 25 sheets.

A registration circuit 38 registers, through a signal line 38a, a predetermined maximum number A of received sheets to be stapled, for example 25 sheets.

A registration circuit 40 registers, through a signal line 40a, a predetermined minimum number B of received sheets to be stapled, for example 2 sheets.

A control circuit 20 controls the entire facsimile apparatus of the present embodiment, and, particularly in the first embodiment of the present invention, executes such control, utilizing the registration circuit 38 for registering the maximum number of the received sheets to be stapled, as to output the received sheets to a predetermined bin by stapling the sheets of each communication in case the number of the received sheets per communication does not exceed the predetermined number, but to change the output bin in every communication without stapling the sheets for each communication in case the number of the received sheets per communication exceeds the predetermined number.

In this control, the unstapled received sheets are not discharged to the aforementioned predetermined bin to which the stapled received sheets are discharged. Also, in case the number of the received sheets per communication does not exceed the predetermined number, if the number of the sheets received in a communication is one, the received sheet is discharged, without stapling, to such predetermined bin.

FIGS. 2 to 7 are flow charts showing the control sequence of the control circuit 20 in the first embodiment of the present invention, in which the registration circuits 38, 40 shown in FIG. 1 are not used.

Figure 2:
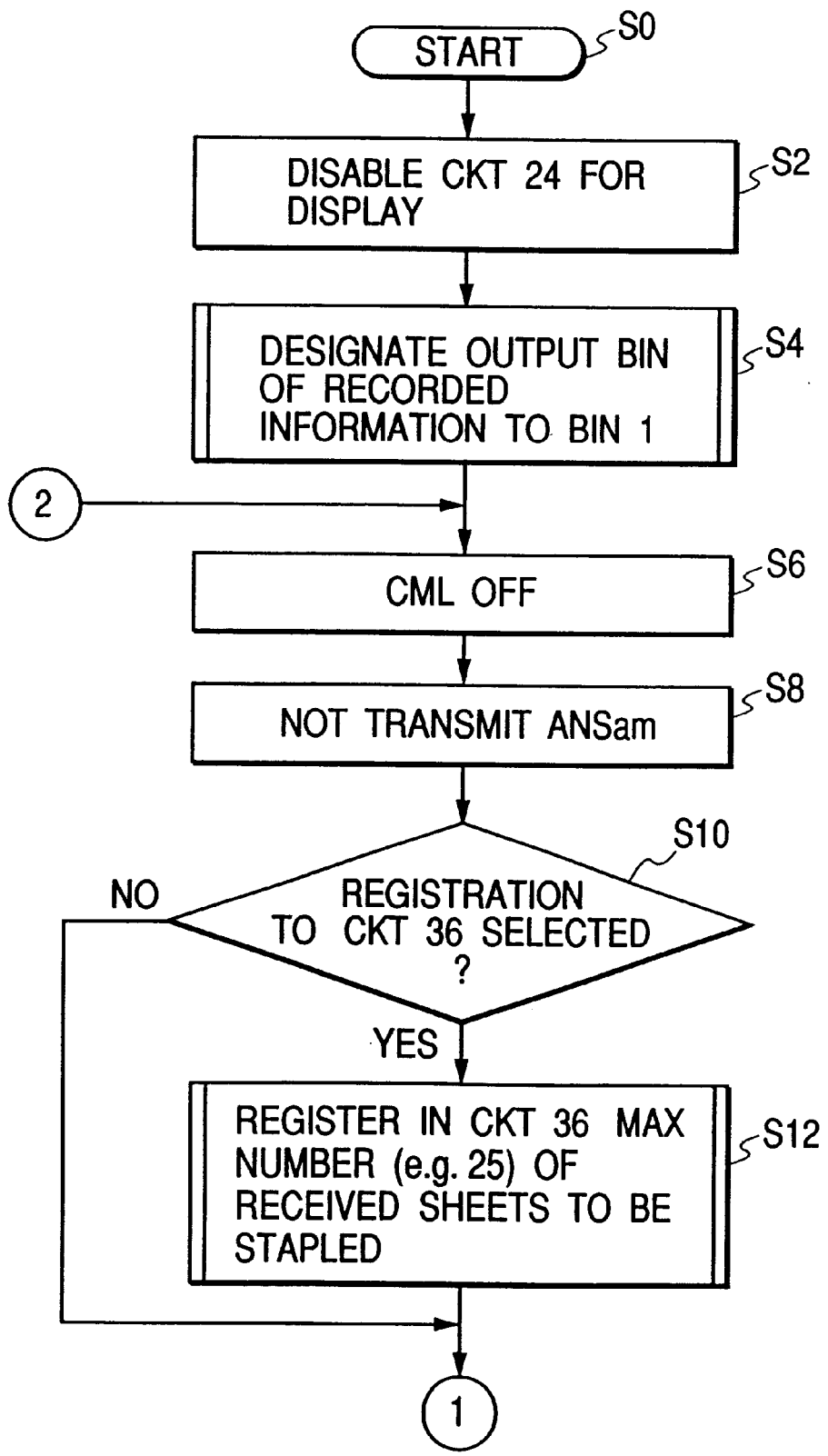
FIGS. 2, 3, 4, 5, 6 and 7 are flow charts showing the function of a first embodiment of the present invention.
Figure 3:
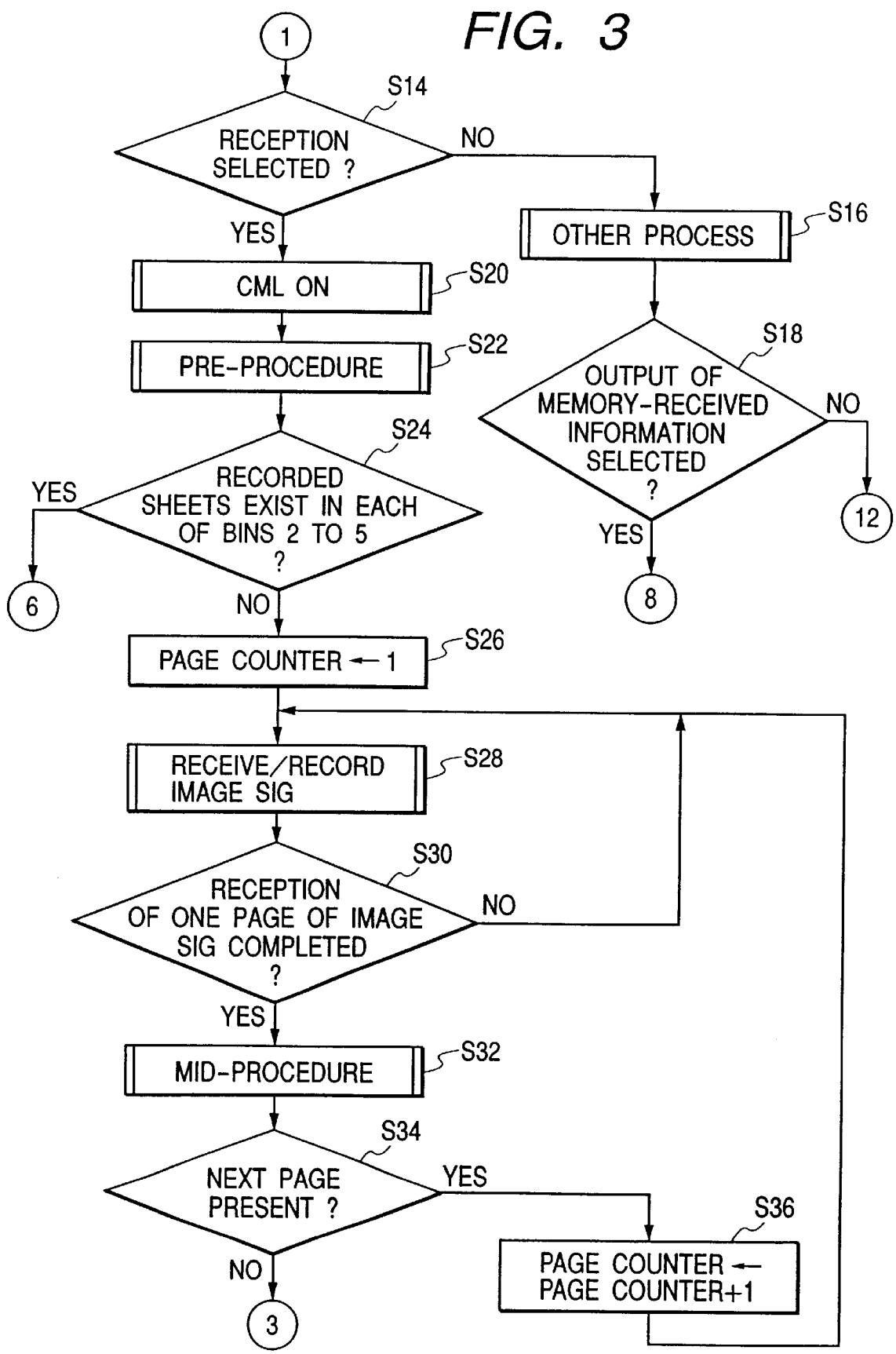
Figure 4:
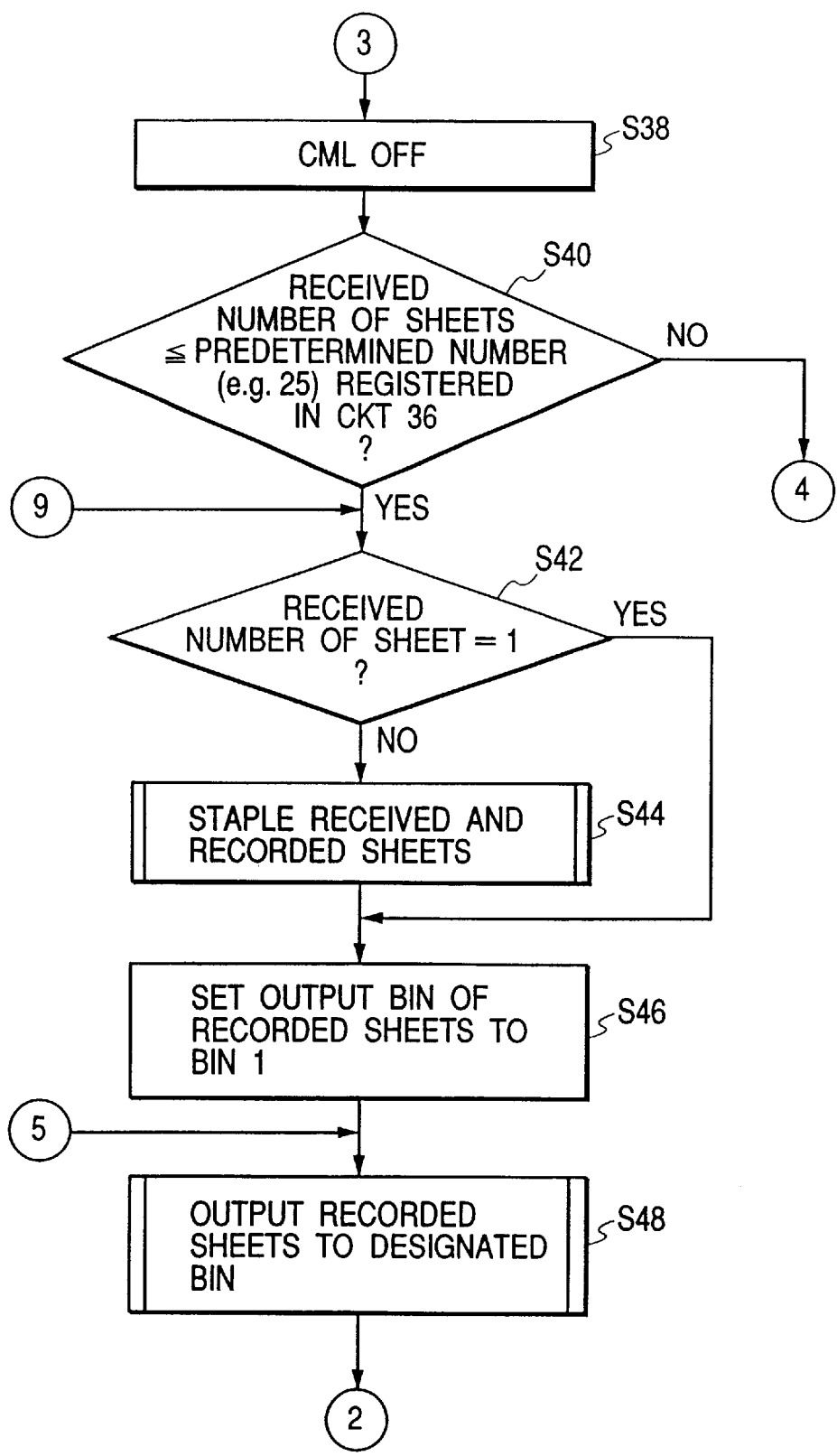
Figure 5:
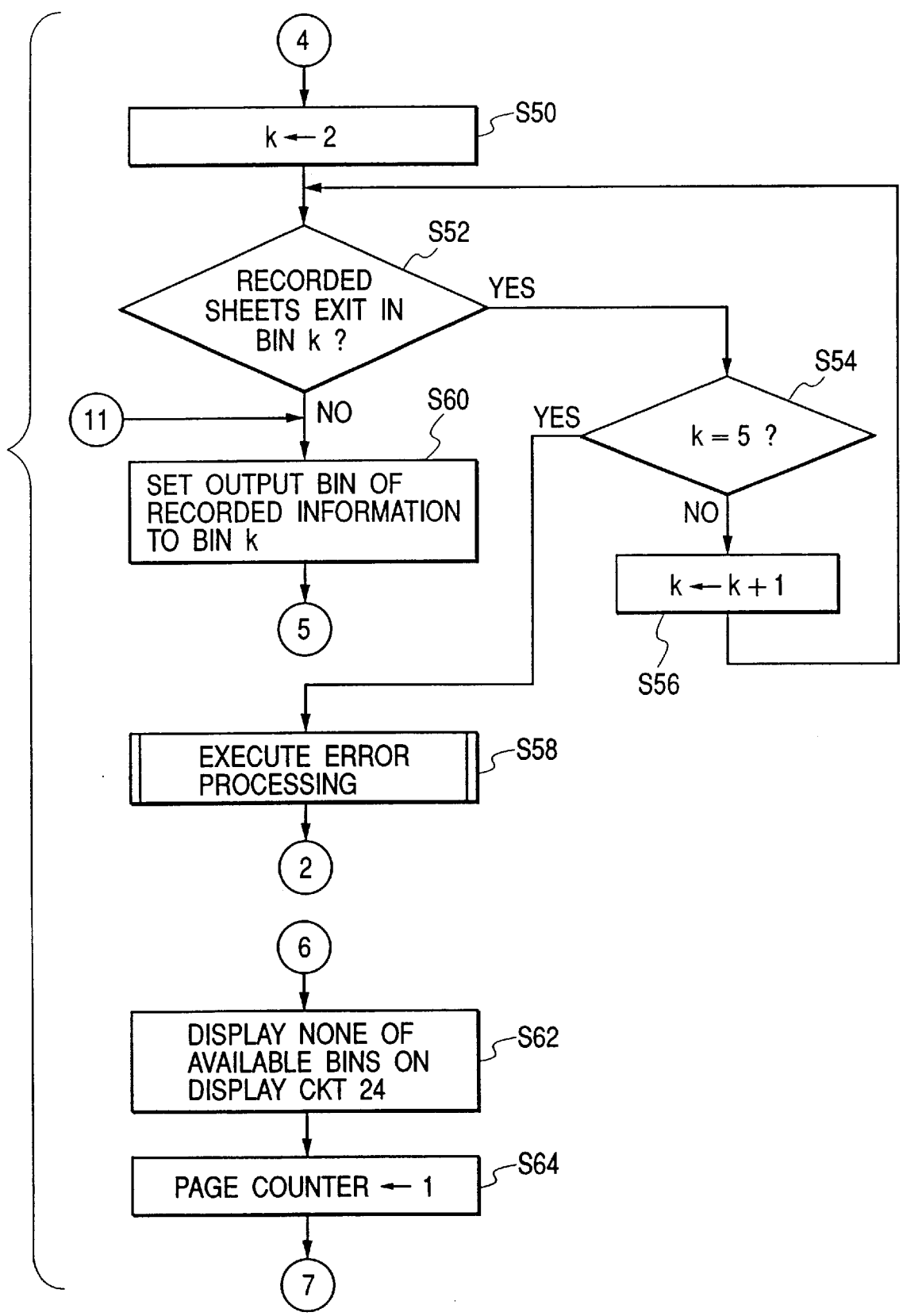
Figure 6:
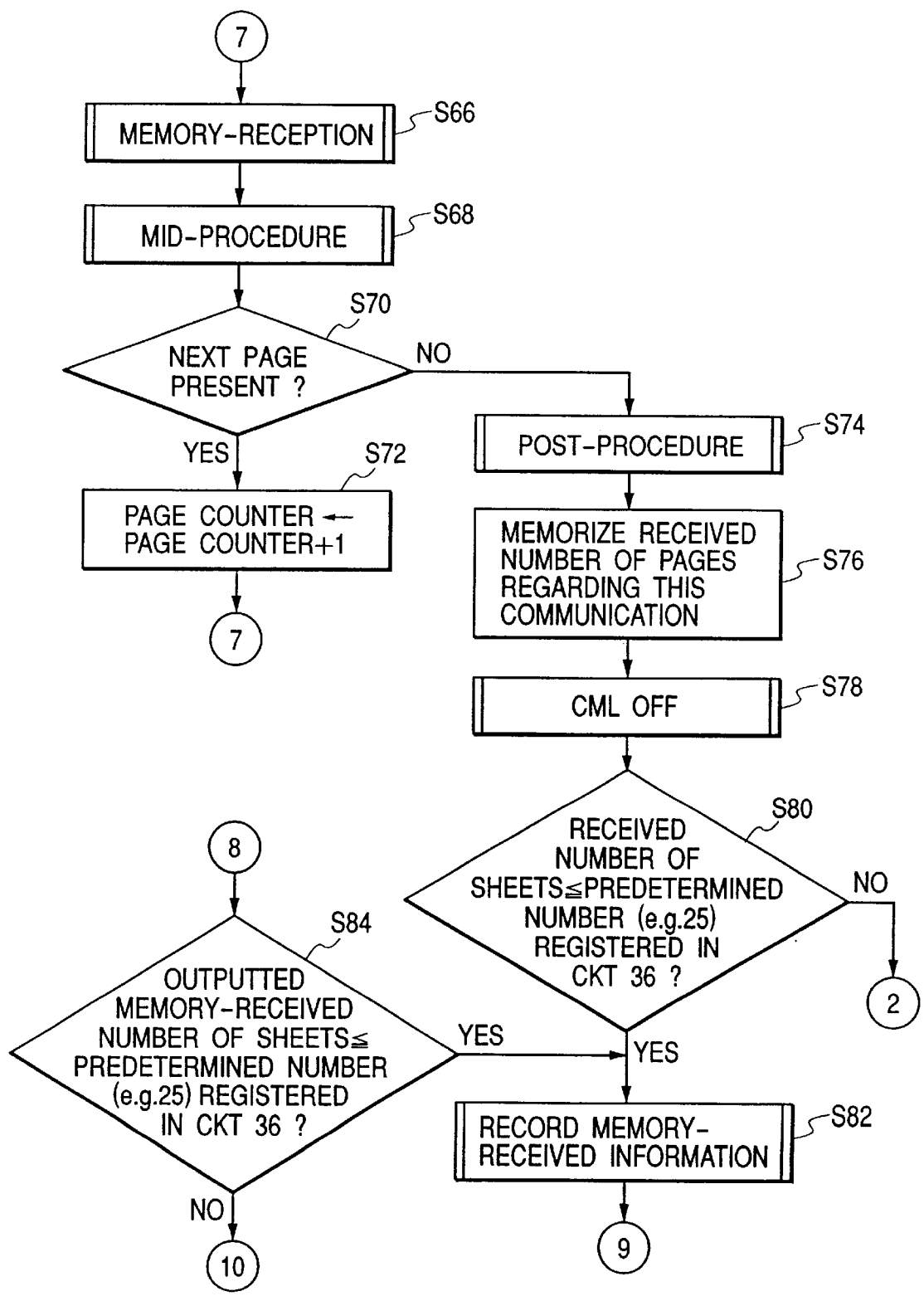
Figure 7:
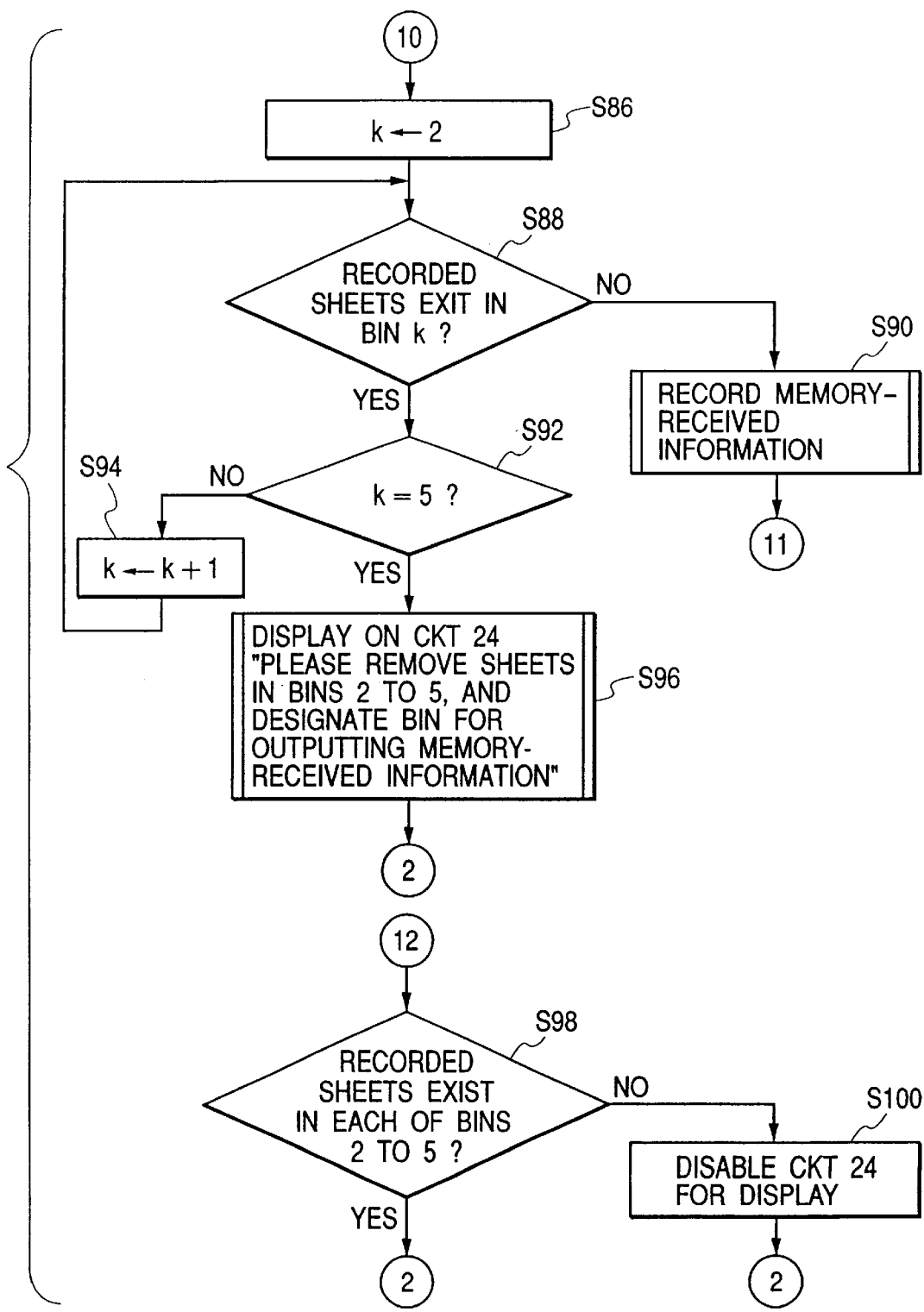

Referring to FIG. 2, a step 50 starts the sequence and a step S2 outputs a signal of a level "0" to the signal line 20*i*, whereby the display circuit 24 does not provide the display for the absence of the output bins. A step S4 outputs a signal "1" to the signal line 20*h*, thereby designating the output of the recorded sheets to the bin 1. Then a step S6 outputs a signal "0" to the signal line 20*a*, thereby turning off the CML, and a step S8 outputs a signal "0" to the signal line 20*d* for not sending the ANSam signal.

Then a step S10 enters the information of the signal line 22*a* and discriminates whether the registration to the registration circuit 36 is selected, and, if selected, the sequence proceeds to a step S12 for registering the maximum number of the received sheets to be stapled, for example 25 sheets, in the registration circuit 36 through the signal line 36*a*, and the sequence then proceeds to a step S14. If not selected, the sequence proceeds directly to the step S14.

The step S14 discriminates whether a receiving operation is selected, and, if selected, the sequence proceeds to a step S20, but, if not selected, the sequence proceeds to a step S16 for other processes. A step S18 enters the information of the signal line 22*a* and discriminates whether the output of memory reception is selected, and, if selected, the sequence proceeds to a step S84, but, if not selected, the sequence proceeds to a step S98.

A step S20 outputs a signal of a level "1" to the signal line 20*a* to turn on the CML, and a step S22 executes a pre-procedure. Then a step S24 enters the information of signal lines 28*a*, 30*a*, 34*a* to discriminate whether the received sheets are present in all the bins 2, 3, 4 and 5, and the sequence proceeds to a step S62 or S26 respectively if the result is affirmative or negative.

The step S26 sets "1" in a page counter, and a step S28 executes reception/recording of the image signal. A step S30 discriminates whether the reception of the image signal of a page has been completed, and, if not, the sequence proceeds to the step S28, but, if completed, the sequence proceeds to a step S32 for executing an intermediate procedure and then to a step S34.

The step S34 discriminates whether a next page is present, and, if present, the sequence proceeds to a step S36 for increasing the value of the page counter by "1" and then to the step S28. If the next page does not exist, the sequence proceeds to a step S38.

The step S38 outputs a signal of a level "1" to the signal line 20*a*, thereby turning off the CML. A step S40 enters the information of the signal line 36*a*, and discriminates whether the number of the received sheets does not exceed the predetermined number of sheets (for example 25 sheets) registered in the registration circuit 36, and the sequence proceeds to a step S50 or S42 respectively according to whether the predetermined number is exceeded or not.

The step S42 discriminates whether the number of received sheets is one, and, if it is one, the sequence proceeds to a step S46. If it is not one, the sequence proceeds to a step S44 for generating a stapler pulse on the signal line 20*f* to staple the received and recorded sheets, and then proceeds to a step S46.

The step S46 outputs a signal "1" to the signal line 20*h* for designating output of the recorded sheets to the bin 1. A step S48 generates a bin output pulse on the signal line 20*g* for discharging the recorded sheets to the bin 1. The sequence then proceeds to the step S6.

The step S50 sets "2" in k. Then a step S52 enters the information of a signal line (24+2k)*a* to discriminate whether the recorded sheets are present in the bin k, and the sequence proceeds to a step S54 or S60 respectively if the recorded sheets are present or absent.

The step S54 discriminates whether k is "5", and, if "5", the sequence proceeds to a step S58 for executing an error process and then to the step S6. If not "5", the sequence proceeds to a step S56 for increasing the value of k by "1" and then to the step S52.

A step S60 outputs a value "k" to the signal line 20*h* for designating output of the recorded sheets to the bin k. Then the sequence proceeds to the step S48.

A step S62 outputs a signal "1" to the signal line 20*i*, thereby causing the display circuit 24 to display the absence of the available output bins. A step S64 sets "1" in the page counter. A step S66 executes the memory-reception, and a step S68 executes the intermediate procedure.

Then a step S70 discriminates whether a next page is present, and, if present, the sequence proceeds to a step S72 for increasing the value of the page counter by "1", and to the step S66.

If the next page does not exist, the sequence proceeds to a step S74 for executing a post-procedure. Then a step S76 memorizes the number of received pages corresponding to the current communication. A step S78 outputs a signal "0" to the signal line 20*a* to turn off the CML.

Then a step S80 enters the information of a signal line 36*a*, and discriminates whether the number of the received sheets does not exceed the predetermined number of sheets (for example 25 sheets) registered in the registration circuit 36, and, if the predetermined number is not exceeded, the sequence proceeds to a step S82 for recording the memory reception and then to the step S42. If the predetermined number is exceeded, the sequence proceeds to the step S6.

A step S84 enters the information of the signal line 36*a*, and discriminates whether the number of the sheets to be discharged, received by memory reception, does not exceed the predetermined number of sheets (for example 25 sheets) registered in the registration circuit 36, and, if the predetermined number is not exceeded, the sequence proceeds to the step S82, but, if the predetermined number is exceeded, the sequence proceeds to a step S86.

The step S86 sets "2" as k. A step S88 enters the information of a signal line (24+2k)*a*, and discriminates whether the recorded sheets are present in the bin k, and, if present, the sequence proceeds to a step S92. If absent, the sequence proceeds to a step S90 for recording the sheets of memory reception and then to the step S60.

A step S92 discriminates whether k is "5", and, if not, the sequence proceeds to a step S94 for increase the value of k by "1", but, if it is "5", the sequence proceeds to a step S96 for displaying, on an unrepresented display unit, a message that the output of the memory reception should be designated after the received sheets are removed from the bins 2, 3, 4 and 5. Then the sequence proceeds to the step S6.

A step S98 enters the information of the signal lines 28a, 30a, 32a and 34a and discriminates whether the recorded sheets are present in all the bins 2, 3, 4 and 5, and, if present, the sequence proceeds to the step S6, but, if not, the sequence proceeds to a step S100.

The step S100 outputs a signal of a level "0" to the signal line 20i for causing the display circuit 24 to display the absence of available bins, and the sequence then proceeds to the step S6.

In the following there will be explained a second embodiment of the present invention.

In this second embodiment, utilizing the registration circuits 38, 40, the control circuit 20 executes control in such a manner that the received sheets for each communication are stapled and outputted to a predetermined bin A in case the number of the received sheets in a communication does not exceed a predetermined number A but at least equal to a predetermined number B, that the received sheet of each communication are outputted to a predetermined bin B without stapling if the number of the received sheets in a communication is less than the predetermined number B, and that the sheets of each communication are not stapled and the output bin is changed for each communication if the number of the received sheets in a communication exceeds the predetermined number A.

In such control, the received sheets of which number in a communication exceeds the predetermined number A are not stapled for each communication and the output bin is changed for each communication among the bins other than the predetermined bins A and B.

Figure 8:
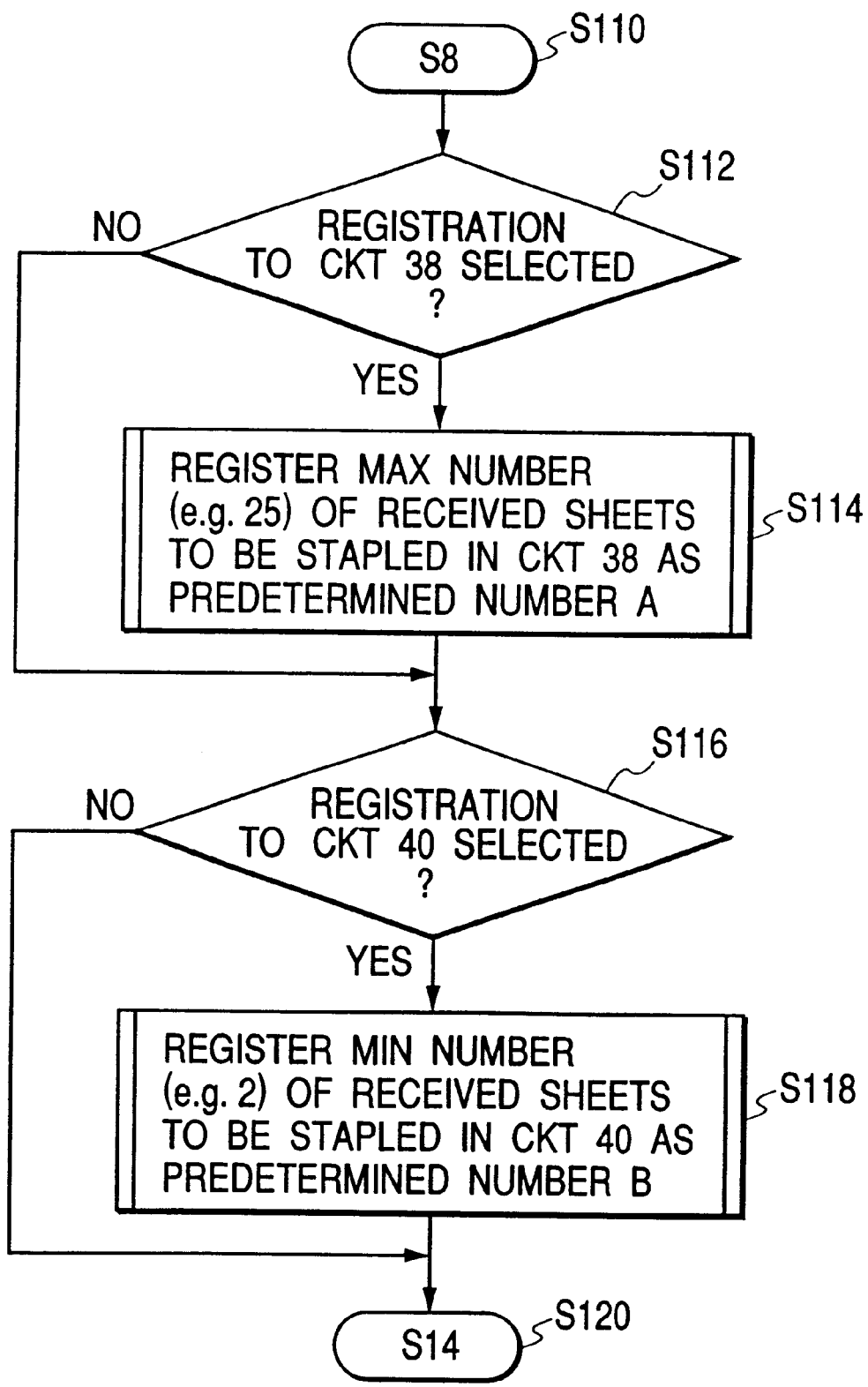
FIGS. 8, 9 and 10 are flow charts showing the function of a second embodiment of the present invention.
Figure 9:
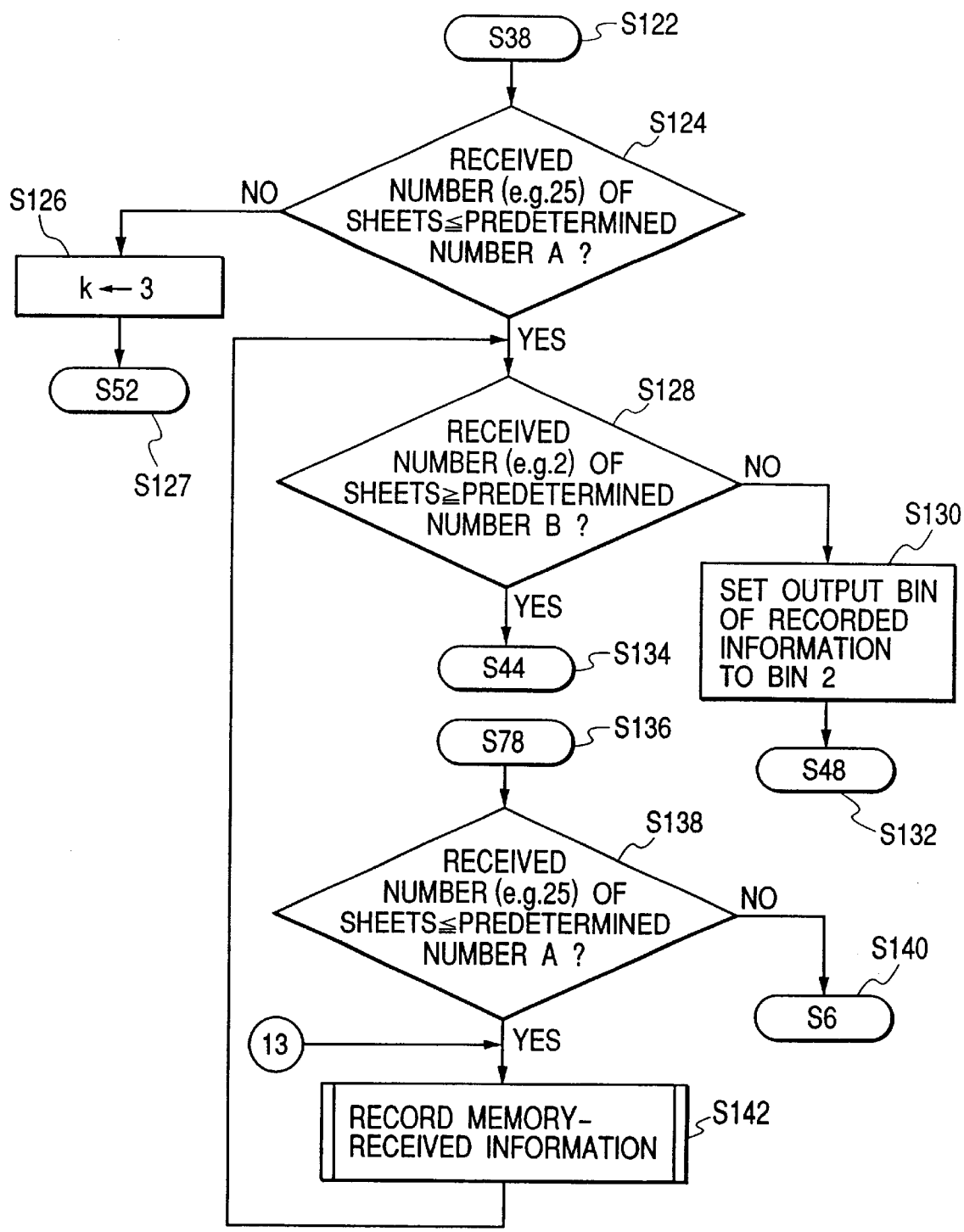
Figure 10:
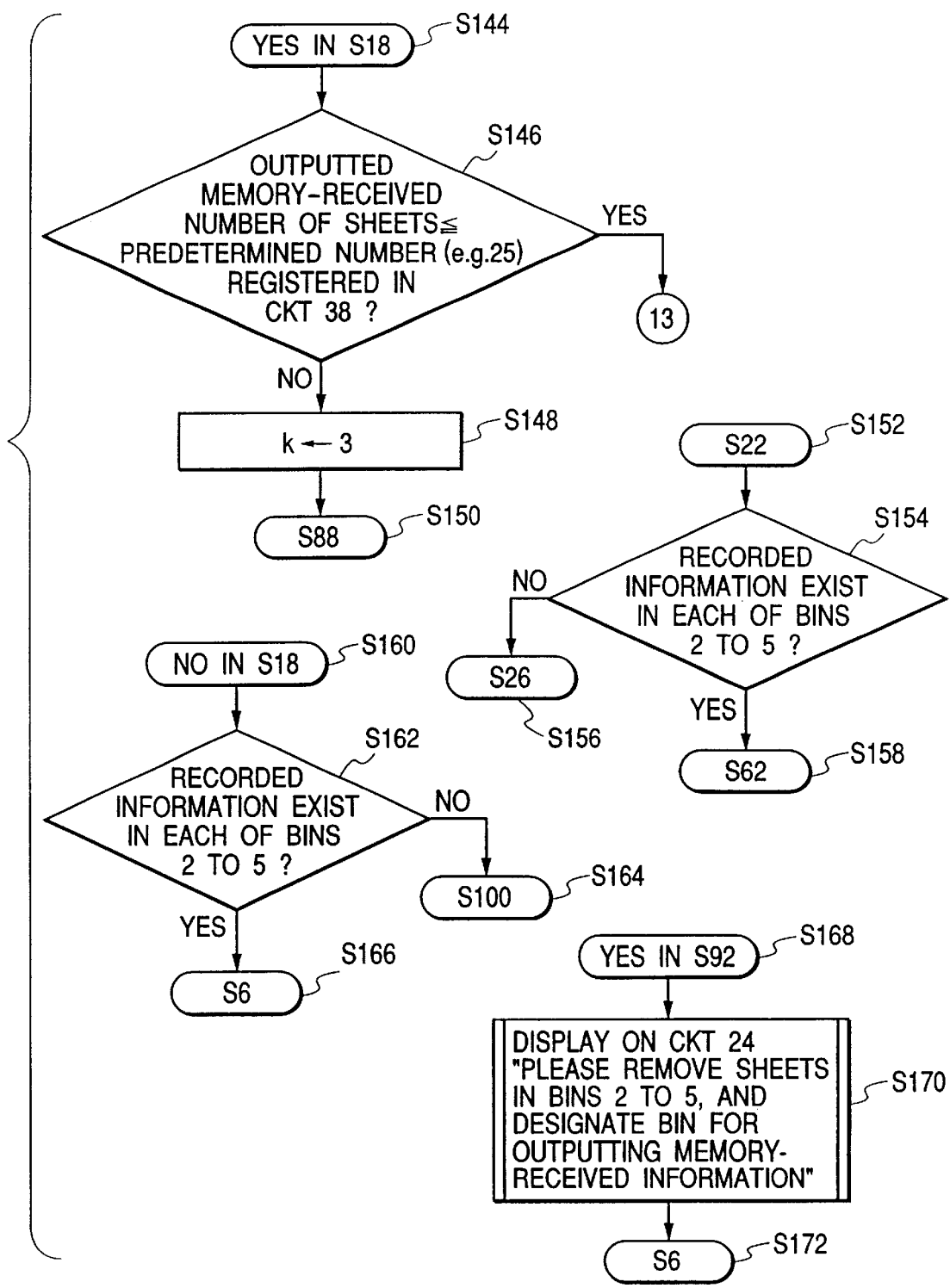

FIGS. 8 to 10 are flow charts of the operation sequence of this second embodiment, only showing parts different from those in the first embodiment (shown in FIGS. 2 to 7). In the present second embodiment, the second registration circuit 36 is not used.

Referring to FIG. 8, a step S110 corresponds to the step S8. A step S112 enters the information of the signal line 22a and discriminates whether the registration to the registration circuit 38 is selected, and, if selected, the sequence proceeds to a step S114 for registering the maximum number of the received sheets to be stapled, for example 25 sheets, in the registration circuit 38 through a signal line 38a, and then proceeds to a step S116. If the registration circuit 38 is not selected, the sequence directly proceeds to the step S116.

The step S116 enters the information of the signal line 22a and discriminates whether the registration to the registration circuit 40 is selected, and, if selected, the sequence proceeds to a step S118 for registering the minimum number of the received sheets to be stapled, for example 2 sheets, in the registration circuit 40 through a signal line 40a, and then proceeds to a step S120 (S14). If the registration circuit 40 is not selected, the sequence directly proceeds to the step S120 (S14).

A step S122 corresponds to the step S38. A step S124 enters the information on the signal line 38a and discriminates whether the number of the received sheets does not exceed the predetermined number A (for example 25 sheets) registered in the registration circuit 38, and, if the predetermined number A is not exceeded, the sequence proceeds to a step S128, but, if the predetermined number A is exceeded, the sequence proceeds to a step S126 for setting "3" as k and further proceeds from a step S127 to the step S52.

A step S128 enters the information of the signal line 40a and discriminates whether the number of the received sheets is at least equal to the predetermined number B (for example 2 sheets) registered in the registration circuit 40, and, if so, the sequence proceeds to a step S134 (S44). On the other hand, if not, the sequence proceeds to a step S130 for outputting "2" to the signal line 20h thereby designating the output of the recorded sheets to the bin 2. Then the sequence proceeds from a step S132 to the step S48.

A step S136 corresponds to the step S78. A step S138 enters the information on the signal line 38a and discriminates whether the number of the received sheets does not exceed the predetermined number A (for example 25 sheets) registered in the registration circuit 38, and, if the predetermined number A is not exceeded, the sequence proceeds to a step S142 for recording the sheets of memory reception, and further proceeds to the step S128. If the predetermined number A is exceeded, the sequence proceeds to the step S140 (S6).

A step S144 corresponds to the YES branch of the step S18. A step S146 enters the information on the signal line 38a and discriminates whether the number of the memory reception sheets to be discharged does not exceed the predetermined number A (for example 25 sheets) registered in the registration circuit 38, and, if the predetermined number A is not exceeded, the sequence proceeds to the step S142, but, if the predetermined number A is exceeded, the sequence proceeds to a step S148 for setting "3" as k and further proceeds from a step S150 to the step S88.

A step S152 corresponds to the step S22. The step S154 enters the information on the signal lines 30a, 32a and 34a and discriminates whether the recorded sheets are present in all the bins 3, 4 and 5, and, if present, the sequence proceeds to a step S158 (S62), but, if the predetermined number A is exceeded, the sequence proceeds to a step S156 (S26).

A step S160 corresponds to the NO branch of the step S18. A step S162 enters the information on the signal lines 30a, 32a and 34a and discriminates whether the recorded sheets are present in all the bins 3, 4 and 5, and, if present, the sequence proceeds to a step S166 (S6), but, if the predetermined number A is exceeded, the sequence proceeds to a step S164 (S100).

A step S168 corresponds to the YES branch of the step S92. A step S170 displays, on an unrepresented display unit, a message that the output of the memory reception should be designated after the received sheets are removed from the bins 3, 4 and 5. Then the sequence proceeds from a step S172 to the step S6.

In the foregoing explanation, the above-described functions of the control circuit are executed by the CPU therein according to a program stored in a ROM or a RAM in the control circuit, but the present invention can also be attained by storing such program in an external memory medium such as a floppy disk, a hard disk, an optical disk, a CD-ROM or a memory card, fetching such program into the control circuit through an exclusive reading device and executing the program by the CPU provided in the control circuit.

Also the foregoing embodiments have been explained by a facsimile apparatus of stand-alone type, but the present invention is not limited to such embodiments and is generally applicable to data communication control in a comprehensive data processing system, in which the copying function, electronic filing function and data processing function are combined with the communicating function.

As explained in the foregoing, the embodiments of the present invention allow to adequately sort the received sheets even with a limited number of output bins for the received sheets since the frequency of facsimile communications with a large number of received sheets per communication is relatively low, whereby an apparatus convenient for the users can be provided.

What is claimed is:

1. A facsimile apparatus comprising:

a recording circuit for recording on sheets information received by way of a communication;

stapling means for stapling the sheets on which the received information is recorded;

sorter means having plural bins for receiving said sheets, wherein said stapling means discharges the sheets to one of the plural bins;

registration means for registering a maximum number of sheets to be stapled; and control means for controlling the stapling means so that said stapling means staples the sheets of each communication and discharges the stapled sheets to a predetermined bin when a number of received sheets does not exceed a predetermined number and for controlling the stapling means so that said stapling means does not staple the sheets of each communication when a number of the sheets exceeds a predetermined number and discharges the sheets for each communication to a different bin, wherein said control means controls so that the received sheets of each communication are stapled and discharged to a predetermined bin 'A' when the number of the received sheets of a communication does not exceed a predetermined number 'A' of sheets and is at least equal to a predetermined number 'B', and wherein the received sheets of each communication are not stapled and discharged to a predetermined bin 'B' when the number of the received sheets of a communication is less than a predetermined number 'B' of sheets, and wherein the received sheets of each communication are not stapled and the bin is changed for each communication when the number of the received sheets in each communication exceeds the predetermined number 'A'.

2. A facsimile apparatus according to claim 1, wherein the received sheets of which number exceeds a predetermined number 'A' in a communication are not stapled for each communication but the bin for discharge is changed for each communication among the bins to bin 'C' which is a different bin from said bins 'A' and 'B'.

3. A facsimile apparatus control method for controlling a facsimile apparatus provided with a recording circuit for recording on sheets information received by way of a communication, stapling means for stapling sheets on which the received information is recorded, and sorter means having plural bins for discharging the sheets, the method comprising the steps of:

registering a maximum number of sheets to be stapled; and stapling the sheets of each received communication and discharging the stapled sheets to a predetermined bin only when a number of received sheets does not exceed a predetermined number, and changing the bin for discharging the sheets for each communication when a number of received sheets does exceed a predetermined number, wherein the sheets of each communication are stapled and discharged to a predetermined bin 'A' when the number of the received sheets of a communication does not exceed a predetermined number 'A' of sheets and is at least equal to a predetermined number 'B', and wherein the sheets of each communication are not stapled and are discharged to a predetermined bin 'B' in case the number of the sheets of a communication is less than a predetermined number 'B' of sheets; and wherein the received sheets of each communication are not stapled and the bin is changed for each communication when the number of the sheets in each communication exceeds the predetermined number 'A'.

4. A facsimile apparatus control method according to claim 3, wherein the received sheets of which number exceeds a predetermined number 'A' in a communication are not stapled for each communication and the bin for discharge is changed for each communication among the bins to bin 'C' which bin is different from said bins 'A' and 'B'.

5. A memory medium storing a program for controlling a facsimile apparatus provided with a recording circuit for recording on sheets information received by way of a communication, stapling means for stapling the sheets on which the received information is recorded, and sorter means having plural bins for discharging said sheets, the program comprising steps of:

registering a maximum number of sheets to be stapled; and stapling the sheets of each received communication and discharging the stapled sheets to a predetermined bin only when a number of received sheets does not exceed a predetermined number, and changing the bin for discharging the sheets for each communication when a number of received sheets does exceed a predetermined number, wherein the sheets of each communication are stapled and discharged to a predetermined bin 'A' when the number of the received sheets of a communication does not exceed a predetermined number 'A' of sheets and is at least equal to a predetermined number 'B', and wherein the sheets of each communication are not stapled and are discharged to a predetermined bin 'B' when the number of the received sheets of a communication is less than a predetermined number 'B' of sheets, and wherein the sheets of each communication are not stapled and the bin is changed for each communication when the number of the received sheets in each communication exceeds the predetermined number'A'.

6. A memory medium according to claim 5, wherein the received sheets of which number exceeds a predetermined number 'A' in a communication are not stapled for each communication and the bin for discharge is changed for each communication among the bins to bin 'C' which bin is different from said bins 'A' and 'B'.

* * * * *

UNITED STATES PATENT AND TRADEMARK OFFICE
CERTIFICATE OF CORRECTION

PATENT NO.     : 6,357,737 B1
DATED          : March 19, 2002
INVENTOR(S)    : Takehiro Yoshida It is certified that error appears in the above-identified patent and that said Letters Patent is hereby corrected as shown below:

Column 2,
Line 46, "4 or" should read -- 4 or 5. --.

Column 4,
Line 67, "increase" should read -- increase of --.

Signed and Sealed this

Twenty-eighth Day of May, 2002

*Attest:*

*Attesting Officer*

JAMES E. ROGAN
*Director of the United States Patent and Trademark Office*